(12) United States Patent
Lee

(10) Patent No.: US 9,476,380 B2
(45) Date of Patent: Oct. 25, 2016

(54) ENGINE PROVIDED WITH CONNECTING LINE CONNECTING EACH CYLINDER

(71) Applicant: Hyundai Motor Company, Seoul (KR)

(72) Inventor: Won Seok Lee, Hwaseong-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 20 days.

(21) Appl. No.: 14/517,653

(22) Filed: Oct. 17, 2014

(65) Prior Publication Data

US 2015/0176519 A1   Jun. 25, 2015

(30) Foreign Application Priority Data

Dec. 24, 2013 (KR) .................. 10-2013-0162946

(51) Int. Cl.
| | |
|---|---|
| F02F 1/18 | (2006.01) |
| F02F 1/42 | (2006.01) |
| F02M 35/108 | (2006.01) |
| F02B 27/02 | (2006.01) |
| F02M 35/10 | (2006.01) |
| F02B 27/00 | (2006.01) |
| F01L 1/18 | (2006.01) |

(52) U.S. Cl.
CPC .................. *F02F 1/18* (2013.01); *F01L 1/185* (2013.01); *F02B 27/006* (2013.01); *F02B 27/0242* (2013.01); *F02F 1/4235* (2013.01); *F02M 35/108* (2013.01); *F02M 35/1085* (2013.01); *F02M 35/10144* (2013.01); *F01L 2105/00* (2013.01); *Y02T 10/146* (2013.01)

(58) Field of Classification Search
CPC .... F02B 27/00; F02B 27/02; F02B 27/0268; F02B 27/0289; F02B 27/006; F02B 27/0242; F02D 9/00; F02D 9/02; F02D 33/00; F02D 33/02; F02M 35/10; F02M 35/10072; F02M 35/10078; F02M 35/10209; F02M 35/10242; F02M 35/104; F02M 35/108; F02M 35/1085; F02M 35/10144; F01L 1/185; F01L 2105/00
USPC .................................. 123/193.2, 559.1, 564
See application file for complete search history.

(56) References Cited

U.S. PATENT DOCUMENTS

| | | | | | |
|---|---|---|---|---|---|
| 2,316,618 | A | * | 4/1943 | Pyatt .................. | F02B 1/06 123/1 R |
| 2,770,224 | A | * | 11/1956 | Ericson ................ | F02B 75/041 123/184.41 |
| 5,562,085 | A | * | 10/1996 | Kosuda .................. | F02D 17/02 123/198 F |
| 5,649,512 | A | * | 7/1997 | Flanery, Jr. .......... | F02D 31/005 123/339.23 |
| 7,841,324 | B2 | * | 11/2010 | Dirker ................ | F02D 13/0276 123/568.13 |
| 8,534,261 | B2 | * | 9/2013 | Hatamura ........... | F01L 13/0026 123/299 |

FOREIGN PATENT DOCUMENTS

| | | |
|---|---|---|
| JP | S 61-108826 (A) | 5/1986 |
| JP | 02-103128 (U) | 8/1990 |
| JP | 2-144623 (U) | 12/1990 |
| JP | 2010-174889 A | 8/2010 |
| JP | 2011-179349 A | 9/2011 |
| KR | 10-2008-0099925 (A) | 11/2008 |
| KR | 10-2012-0051222 A | 5/2012 |

* cited by examiner

*Primary Examiner* — Grant Moubry
(74) *Attorney, Agent, or Firm* — Morgan, Lewis & Bockius LLP

(57) ABSTRACT

An engine provided with a plurality of cylinders includes a plurality of connecting lines connecting a first intake port of each of the cylinders having a present firing order and a second intake port of each of the cylinders having a next firing order, and connecting valve units opening and closing the each of the connecting lines.

5 Claims, 5 Drawing Sheets

FIG. 5

| #1 | #2 | #3 | #4 |
|---|---|---|---|
| Power stroke | Exhaust stroke | Compression stroke | Intake stroke |
| Exhaust stroke | Intake stroke | Power stroke | Compression stroke |
| Intake stroke | Compression stroke | Exhaust stroke | Power stroke |
| Compression stroke | Power stroke | Intake stroke | Exhaust stroke | ated to the exemplary engine according to the present invention.

ENGINE PROVIDED WITH CONNECTING LINE CONNECTING EACH CYLINDER

CROSS-REFERENCE TO RELATED APPLICATION

The present application claims priority to Korean Patent Application No. 10-2013-0162946 filed Dec. 24, 2013, the entire contents of which is incorporated herein for all purposes by this reference.

BACKGROUND OF THE INVENTION

1. Field of the Invention

The present invention relates to an engine. More particularly, the present invention relates to an engine provided with connecting lines connecting each cylinder for improving intake efficiency.

2. Description of Related Art

Generally, at the state that an intake valve is opened and an exhaust valve is closed during intake stroke of a cylinder, pressure changes, formed by movement of a piston from a top dead center to a bottom dead center, induce air or air-fuel mixture to flow in the cylinder.

In compression stroke, the intake valve is closed, so that flowing of the air or air-mixture is blocked. This stagnant flowing induces pumping loss as well as intake loss.

Further, in an engine provided with a turbo-charger, air amount flowing into a cylinder is increased in acceleration state, and turbine rotation speed and compressor rotation speed are increased due to increase in combustion gas. Thus, engine output also is improved according to increase in charging air. However, time is required to change power output in response to a throttle change, so called as a Turbo Lag The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an engine having advantages of improving intake efficiency.

In addition, various aspects of the present invention are directed to providing an engine with a turbo charger having advantages of suppressing turbo lag.

According to an aspect of the present invention, an engine provided with a plurality of cylinders may include a plurality of connecting lines which connect a first intake port of each of the cylinders with a present firing order and a second intake port of each of the cylinders having a next firing order, and connecting valve units opening and closing each of the connecting lines.

Each of the connecting valve units may be opened at an end of an intake stroke or at a beginning of a compression stroke of each of the cylinders having the present firing order.

Each of the connecting valve units may be closed at an end of the compression stroke or at a beginning of a power stroke of each of the cylinders having the present firing order.

Each of the connecting valve units may include a connecting cam on an input shaft and a connecting valve opened and closed by the connecting cam.

The first and second intake port may form a pair, an inlet, connected to one of the cylinders with the next firing order, may be formed on one of the first and second intake ports, and an outlet, which is connected to one of the cylinders having the previous firing order, may be formed on another of the first and second intake ports.

According to another aspect of the present invention, an engine provided with a plurality of cylinders may include a plurality of connecting lines connecting a first intake port of each cylinder with a present firing order and a second intake port of each cylinder with a next firing order, and connecting valve units opening and closing the each of the connecting lines in which the connecting valve units may be opened to communicate either of the first and second intake ports of the each cylinder having the present firing order with either of the first and second intake ports of each of the cylinders having the next firing order at an intake stroke of the cylinder with the next firing order.

Each of the connecting valve units may include a connecting cam on an input shaft and a connecting valve opened and closed by the connecting cam.

Each of the connecting valve units may be opened at an end of an intake stroke or at a beginning of a compression stroke of each of the cylinders having the present firing order.

Each of the connecting valve units may be closed at an end of the compression stroke or at a beginning of a power stroke of each of the cylinders having the present firing order.

The first and second intake ports may form a pair, an inlet, which is connected to one of the cylinders having the next firing order, may be formed on one of the first and second intake ports, and an outlet, which is connected to one cylinder having the previous firing order, may be formed on another of the first and second intake ports.

According to an exemplary embodiment of the present invention, intake efficiency may be improved and turbo lag may be suppressed in a turbo charger engine.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a chart showing firing order of a general four cylinder engine.

Figure 1:
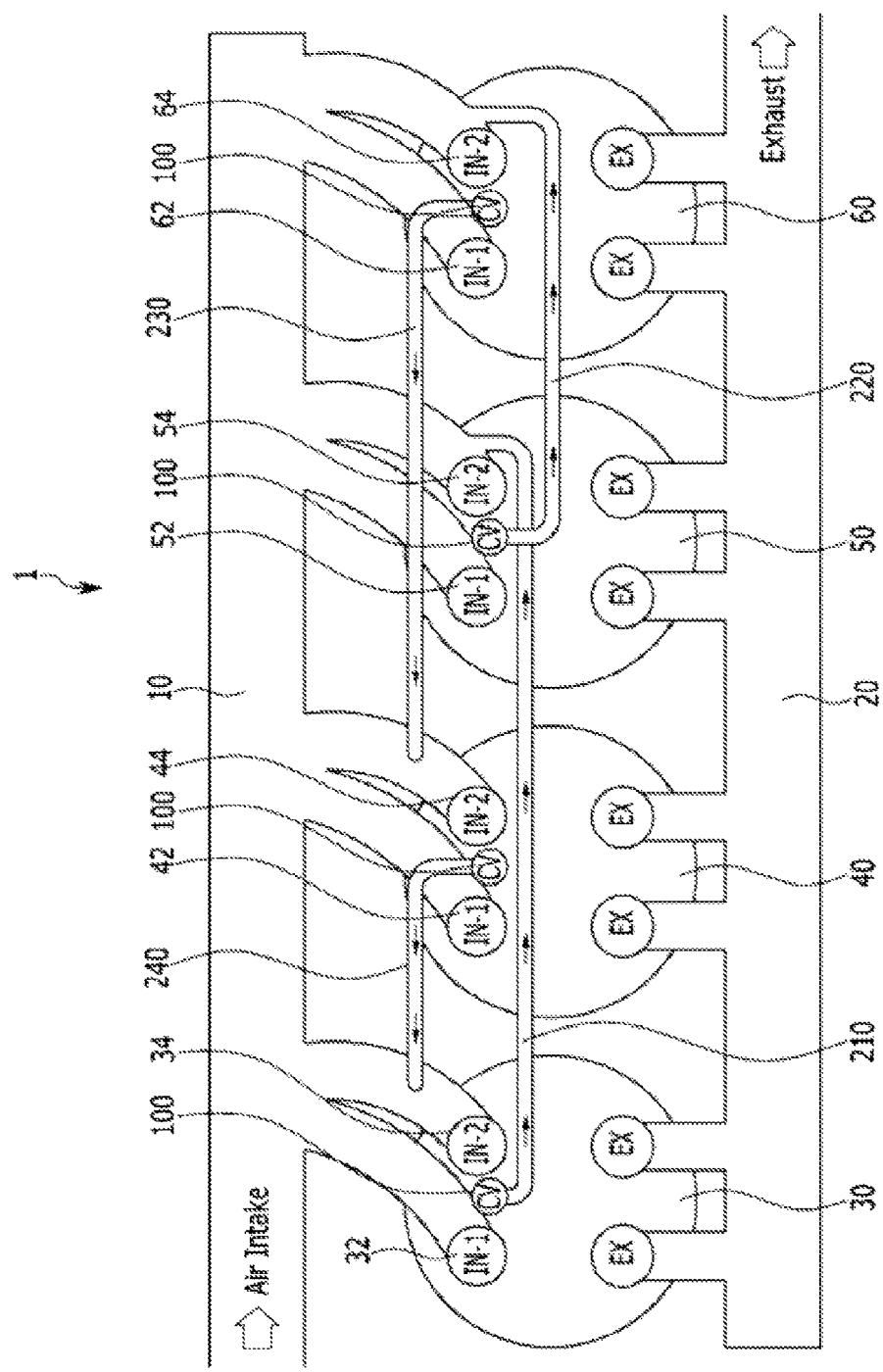
FIG. 1 is a drawing showing an exemplary engine according to the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the drawings, the thickness of layers, films, panels, regions, etc., are exaggerated for clarity.

It will be understood that when an element such as a layer, film, region, or substrate is referred to as being "on" another element, it can be directly on the other element or intervening elements may also be present.

In contrast, when an element is referred to as being "directly on" another element, there are no intervening elements present.

Throughout the specification and the claims, unless explicitly described to the contrary, the word "comprise" and variations such as "comprises" or "comprising", will be understood to imply the inclusion of stated elements but not the exclusion of any other elements.

FIG. 5 is a chart showing firing order of a general four cylinder engine.

Referring to FIG. 5, a firing order of a general four sequential cylinder engine is 1-3-4-2 cylinders in sequence. For example, after an intake stroke of the first cylinder, a compression stroke is proceeded and at the same time an exhaust stroke is finished and then intake stroke is proceeded in the third cylinder.

During the intake stroke, an exhaust valve is closed and an intake valve is opened, and during the compression stroke, the intake valve is closed and a piston moves down to do the compression stroke. In this case, air flowing into the cylinder in the intake stroke is congested by closing of the intake valve.

Referring to FIG. 1 to FIG. 4, an engine 1 according to an exemplary embodiment of the present invention includes a plurality of cylinders 30, 40, 50 and 60, a plurality of connecting lines 210, 220, 230 and 240 which connect an intake port of the each cylinder 30, 40, 50 and 60 with a present firing order and an intake port of the each cylinder 30, 40, 50 and 60 with next a firing order, and connecting valve units 100 opening and closing each of the connecting lines 210, 220, 230 and 240.

For better comprehension and ease of description, from the left to right of FIG. 1 will be designated as a first cylinder 30, a second cylinder 40, a third cylinder 50 and a fourth cylinder 60 sequentially. Each pair of intake ports 32 and 34, 42 and 44, 52 and 54, and 62 and 64 is formed on each of the first cylinder 30, second cylinder 40, third cylinder 50 and fourth cylinder 60 respectively, and is connected with an intake manifold 10, and each exhaust EX is connected with an exhaust manifold 20.

In FIG. 1, IN-1 will be designated as a first port of each cylinder and IN-2 will be designated as a second port of each cylinder.

Each inlet of each connecting line 210, 220, 230 and 240 is formed to a corresponding first port 32, 42, 52 and 62 of each cylinder 30, 40, 50 and 60, and each outlet of each connecting line 210, 220, 230 and 240 is formed to a corresponding second port 34, 44, 54 and 64 each cylinder 30, 40, 50 and 60

For better comprehension and ease of description, the connecting line connecting the first cylinder 30 and the third cylinder 50 will be designated as a first connecting line 210, the connecting line connecting the third cylinder 50 and the fourth cylinder 60 will be designated as a second connecting line 220, the connecting line connecting the fourth cylinder 60 and the second cylinder 40 will be designated as a third connecting line 230, and the connecting line connecting the first cylinder 30 and the second cylinder 40 will be designated as a first connecting line 240.

Figure 2:
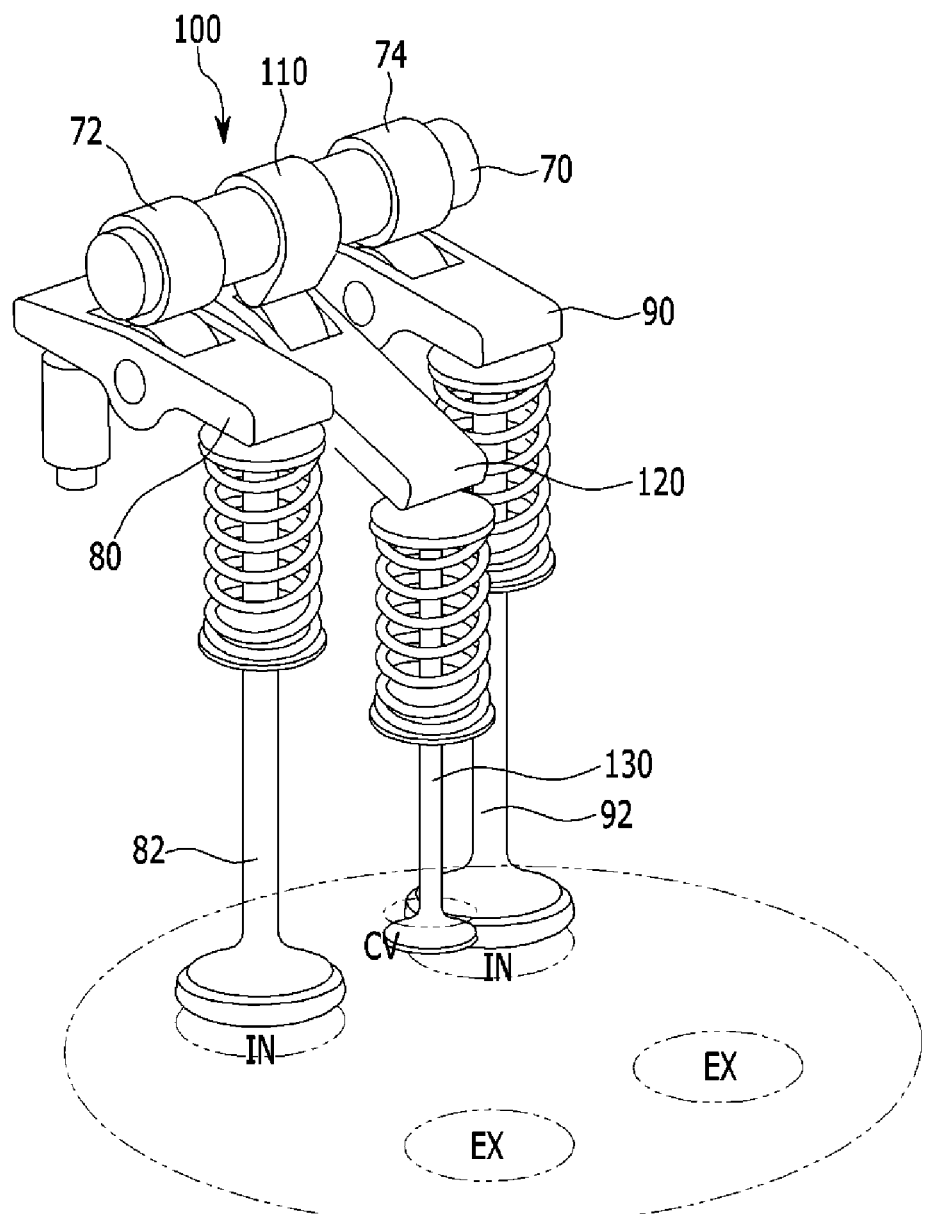
FIG. 2 is a perspective view of a connecting valve unit applied to the exemplary engine according to the present invention.
Figure 3:
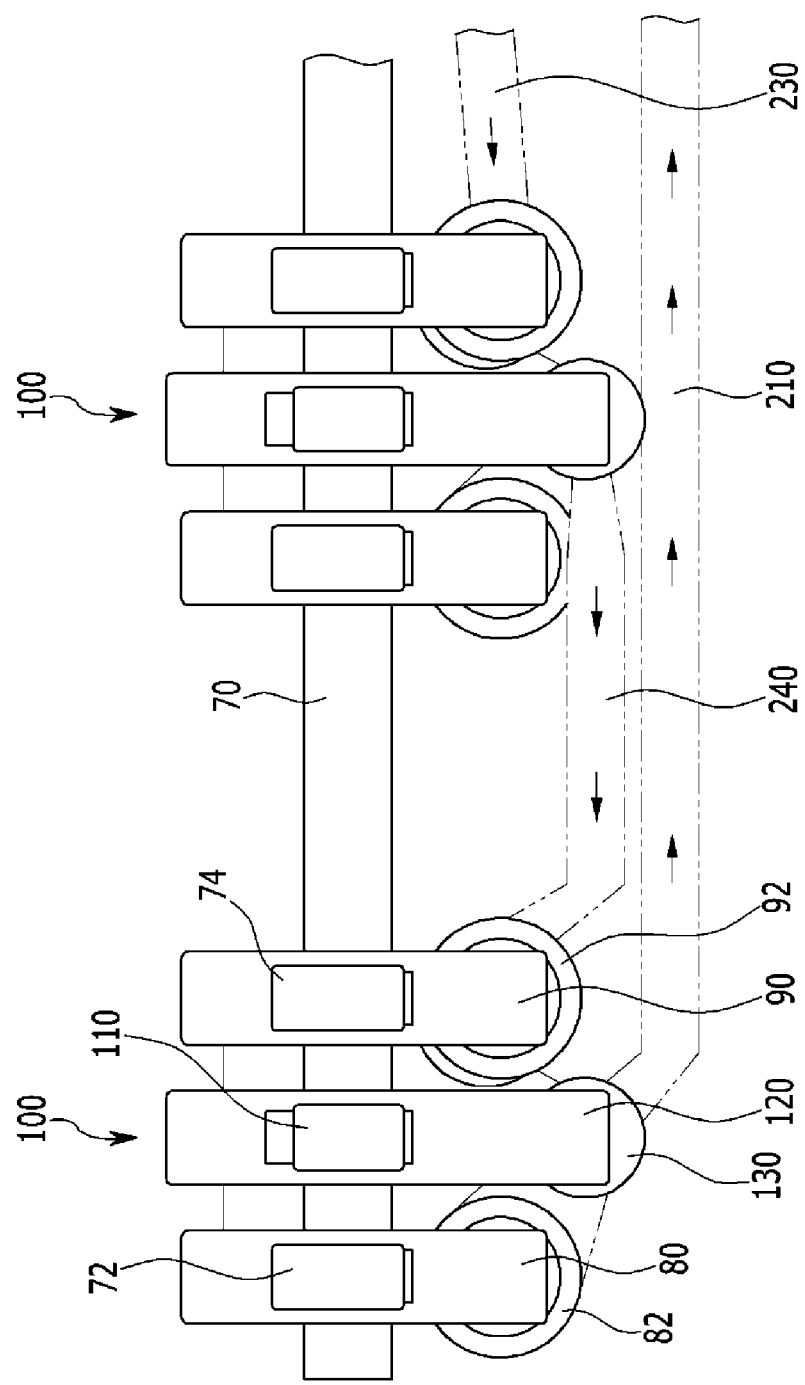
FIG. 3 is a top plan view of the connecting valve unit applied to the exemplary engine according to the present invention.
Figure 4:
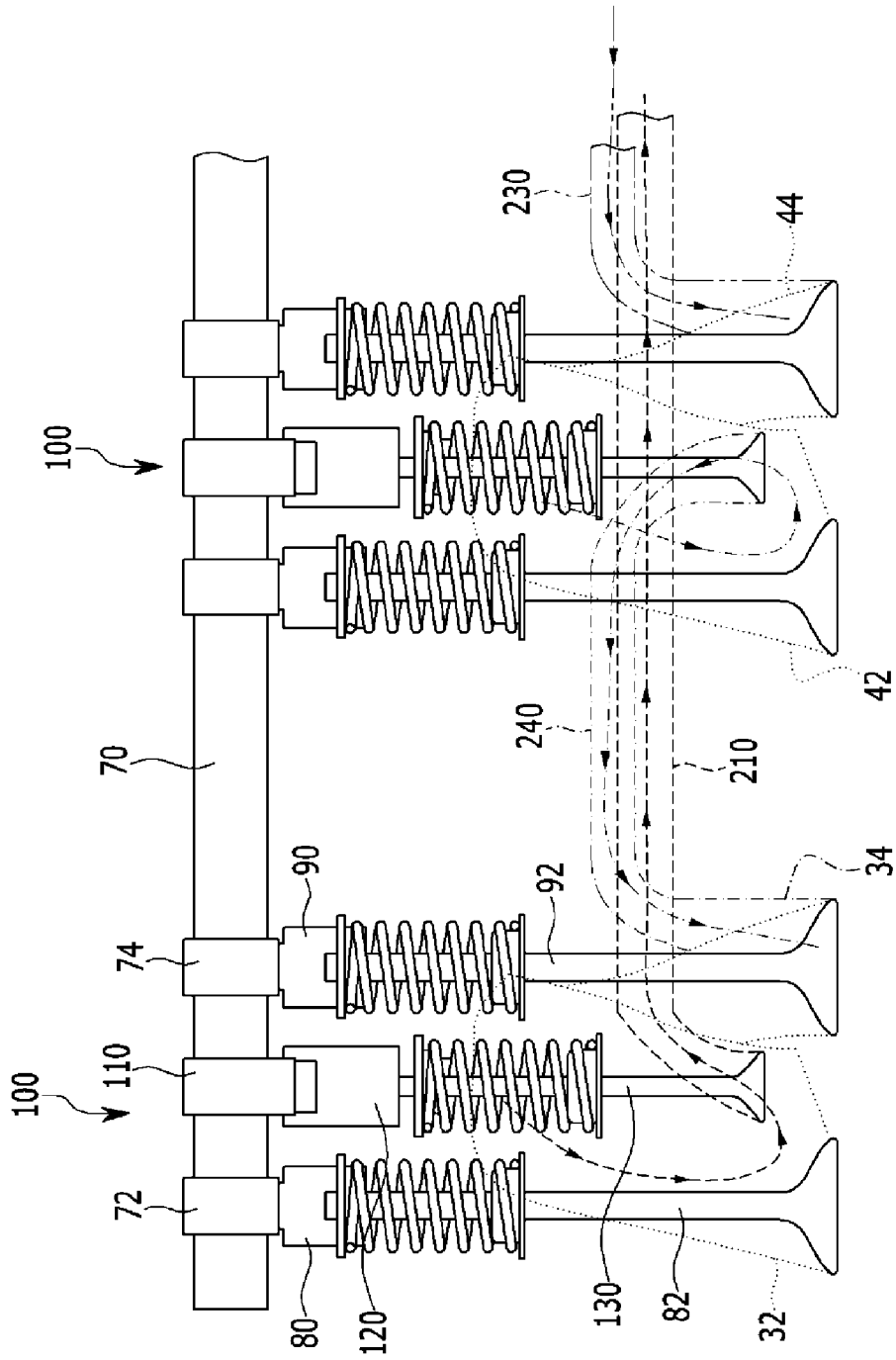
FIG. 4 is a front view of the connecting valve unit applied to the exemplary engine according to the present invention.

Referring to FIG. 2, cams 72 and 74 rotated with an input shaft 70 push rocker arms 80 and 90, and then intake valves 82 and 92 connected with the rocker arms 80 and 90 are opened.

The connecting valve unit 100 includes a connecting cam 110 provided to the input shaft 70 and a connecting valve 130 opened by the connecting cam 110. A rocker arm 120, which changes rotation motion of the connecting cam 110 to reciprocal motion, is disposed between the connecting cam 110 and the connecting valve 130. However it is not limited thereto, for example, a valve with a tappet may be provided thereto.

Phases of the cam 72 and 74 and a phase of the connecting cam 110 are different. That is, the phase of the connecting cam 110 may be retarded relative to the phases of the cam 72 and 74.

So, the connecting valve unit 100 may be opened at an end of the intake stroke or at a beginning of the compression stroke of each cylinder with present firing order and may be closed at an end of the compression stroke or at a beginning of a power stroke of each cylinder with present firing order.

The connecting valve unit 100 is opened at the end of the intake stroke of a corresponding cylinder or at the beginning of the compression stroke of each cylinder with present firing order of the corresponding cylinder, that is, the connecting valve unit 100 is opened just before or directly after the intake valves 82 and 92 are closed. Thus the inflowing air is supplied to the cylinder of which next intake stroke is implemented so as to prevent pumping loss due to intake loss of the corresponding cylinder. Also, since the air flows into the cylinder with the next firing order, intake efficiency of the cylinder with the next firing order may be improved.

Referring to FIG. 1 to FIG. 5, operations of the engine according to various exemplary embodiments of the present invention will be discussed.

In the drawings, a four cylinder engine is shown, however the present invention is not limited thereto. An engine with a plurality of cylinders and with time interval for the intake stroke for each cylinder may correspond to the engine according to various exemplary embodiments of the present invention.

For example, when the first cylinder 30 is in intake stroke, the intake valves 82 and 92 of the first cylinder 30 are opened, and then the intake valves 82 and 92 are closed at the end of the intake stroke or at the beginning of the compression stroke of the first cylinder 30. At this state the connecting valve 130 is opened. Then, the air flowing toward the first port 32 of the first cylinder 30 is supplied to the second port 54 of the third cylinder 50 though the first connecting line 210 so that intake efficiency of third cylinder 50 may be improved.

Like the proceeding, when the third cylinder 50 is in intake stroke, the intake valves 82 and 92 of the third cylinder 50 are opened, and then the intake valve 82 and 92 are closed at the end of the intake stroke or at the beginning of the compression stroke of the third cylinder 50. At this state the connecting valve 130 is opened. Then, the air flowing toward the first port 52 of the third cylinder 50 is supplied to the second port 64 of the fourth cylinder 60 though the second connecting line 220 so that intake efficiency of fourth cylinder 60 may be improved.

Sequentially, each connecting valve 130 of the fourth cylinder 60 and the second cylinder 40 is opened at the end of the intake stroke or at the beginning of the compression stroke of the corresponding cylinder.

The each connecting valve 130 is closed at an end of compression stroke or at beginning of power stroke of the each cylinder with present firing order so that leakage of air or combustion gas may be prevented.

Since each inlet of each of the connecting lines 210, 220, 230 and 240 is formed to a corresponding first port 32, 42, 52 and 62 of each cylinder 30, 40, 50 and 60, and each outlet of each connecting line 210, 220, 230 and 240 is formed to each corresponding second port 34, 44, 54 and 64 of each cylinder 30, 40, 50 and 60. Thus swirling may occur during the intake stroke, so that intake efficiency may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine provided with a plurality of cylinders comprising:
    a plurality of connecting lines connecting a portion of a first intake port of each of the cylinders having a present firing order and a portion of a second intake port of each of the cylinders having a next firing order; and
    connecting valve units mounted to the connecting lines and opening and closing each of the connecting lines,
    wherein each of the connecting valve units is opened at an end of an intake stroke or at a beginning of a compression stroke of each of the cylinders having the present firing order,
    wherein the each of the connecting valve units is closed at an end of the compression stroke or at a beginning of a power stroke of each of the cylinders having the present firing order,
    wherein the first and second intake ports form a pair,
    wherein an inlet, connected to one of the cylinders having the next firing order, is formed on one of the first and second intake ports, and
    wherein an outlet, connected to one of the cylinders having the present firing order, is formed on another of the first and second intake ports.

2. The engine of claim 1, wherein each of the connecting valve units comprises:
    a connecting cam on an input shaft; and
    a connecting valve opened and closed by the connecting cam.

3. An engine comprising:
    a plurality of connecting lines connecting a portion of a first intake port of each of a plurality of cylinders with a present firing order and a portion of a second intake port of each of the cylinders with a next firing order; and
    connecting valve units mounted to the connecting lines and opening and closing each of the connecting lines, wherein the connecting valve units are opened to communicate either of the first and second intake ports of each cylinder having the present firing order with either of the first or second intake ports of each cylinder having the next firing order at an intake stroke of the cylinder with the next firing order,
    wherein each of the connecting valve units is opened at an end of an intake stroke or at a beginning of a compression stroke of each of the cylinders having the present firing order, and
    wherein each of the connecting valve units is closed at an end of the compression stroke or at a beginning of a power stroke of each of the cylinders having the present firing order.

4. The engine of claim 3, wherein each of the connecting valve units comprises:
    a connecting cam on an input shaft; and
    a connecting valve opened and closed by the connecting cam.

5. The engine of claim 3,
    wherein the first and second intake ports form a pair,
    wherein an inlet, which is connected to one of the cylinders having the next firing order, is formed on one of the first and second intake ports, and
    wherein an outlet, which is connected with one cylinder having a previous firing order, is formed on another of the first and second intake ports.

* * * * *